United States Patent
Bernardos et al.

(10) Patent No.: US 12,245,333 B2
(45) Date of Patent: Mar. 4, 2025

(54) TERMINAL REQUESTING NETWORK SLICE CAPABILITIES FROM NON-3GPP ACCESS NETWORK

(71) Applicant: InterDigital Patent Holdings, Inc., Wilmington, DE (US)

(72) Inventors: Carlos Jesus Bernardos, Madrid (ES); Ping-Heng Kuo, Bristol (GB); Ulises Olvera-Hernandez, Saint-Lazare (CA); Alain Mourad, Ascot (GB); Charles Turyagyenda, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/509,466

(22) Filed: Nov. 15, 2023

(65) Prior Publication Data
US 2024/0089727 A1    Mar. 14, 2024

Related U.S. Application Data

(63) Continuation of application No. 17/509,407, filed on Oct. 25, 2021, now Pat. No. 11,864,273, which is a
(Continued)

(51) Int. Cl.
*H04W 8/24*    (2009.01)
*H04L 9/40*    (2022.01)
(Continued)

(52) U.S. Cl.
CPC .......... *H04W 8/245* (2013.01); *H04L 63/164* (2013.01); *H04W 12/06* (2013.01); *H04W 48/18* (2013.01); *H04W 60/00* (2013.01); *H04W 76/12* (2018.02)

(58) Field of Classification Search
CPC ..... H04W 8/245; H04W 12/06; H04W 48/18; H04W 60/00; H04W 76/12; H04W 48/14; H04L 63/164
See application file for complete search history.

(56) References Cited

U.S. PATENT DOCUMENTS 10,638,405 B2    4/2020    Myhre et al.
11,159,937 B2    10/2021    Bernardos et al.
(Continued)

FOREIGN PATENT DOCUMENTS

| CN | 106792739 A | 5/2017 | |
|---|---|---|---|
| WO | WO 2017/135859 A1 | 8/2017 | |
| WO | WO-2018128076 A1 * | 7/2018 | ............ H04W 16/02 |

OTHER PUBLICATIONS

3rd Generation Partnership Project (3GPP), S2-170120, "Slice selection support for non-3GPP: NSSAI transport", Huawei, HiSilicon, 3GPP TSG SA WG2 Meeting #118bis, Spokane, USA, Jan. 16-20, 2017, 2 pages.
(Continued)

*Primary Examiner* — Brandon J Miller
(74) *Attorney, Agent, or Firm* — Flaster Greenberg P.C.

(57) ABSTRACT

Systems, methods, and instrumentalities are described for a wireless transmit/receive unit (WTRU), comprising a memory, and a processor to execute instructions from the memory, wherein the processor is configured to access a non-3rd Generation Partnership Project (3GPP) Access Network (AN), establish a link with a Non-3GPP Interworking Function (N3IWF) via the non-3GPP AN, request information from the N3IWF about network slicing capabilities of a 3GPP Radio Access Network (RAN), receive information from the N3IWF about network slicing capabilities of the 3GPP RAN, and determine whether to register with the 3GPP RAN based upon the network slicing capabilities of the 3GPP RAN. Systems, methods, and instrumentalities are
(Continued)

described for sending information about network slicing capabilities of a 3GPP RAN to a N3IWF, establishing a link between a WTRU operating on a non-3GPP AN and the N3IWF via the non-3GPP AN, and sending information from the N3IWF to the WTRU about network slicing capabilities of the 3GPP RAN.

14 Claims, 8 Drawing Sheets

Related U.S. Application Data continuation of application No. 16/638,295, filed as application No. PCT/US2018/046747 on Aug. 14, 2018, now Pat. No. 11,159,937.

(60) Provisional application No. 62/545,160, filed on Aug. 14, 2017.

(51) Int. Cl.
  *H04W 12/06* (2021.01)
  *H04W 48/18* (2009.01)
  *H04W 60/00* (2009.01)
  *H04W 76/12* (2018.01)

(56) References Cited

U.S. PATENT DOCUMENTS

| 11,240,720 B2 | 2/2022 | Shih et al. |
| 2017/0164212 A1 | 6/2017 | Opsenica et al. |
| 2017/0303259 A1 | 10/2017 | Lee et al. |
| 2018/0199279 A1* | 7/2018 | Baek ................ H04W 48/18 |
| 2018/0288582 A1* | 10/2018 | Buckley ............ H04W 12/06 |
| 2018/0310238 A1 | 10/2018 | Opsenica et al. |
| 2019/0053147 A1 | 2/2019 | Qiao et al. |
| 2019/0335330 A1 | 10/2019 | Salkintzis |
| 2020/0120589 A1 | 4/2020 | Velev et al. |

OTHER PUBLICATIONS

3rd Generation Partnership Project (3GPP), S2-173777, "TS 23.501: N31WF selection function", 3GPP WG2 Meeting #121, Hangzhou, China, May 15-19, 2017, 3 pages.

3rd Generation Partnership Project (3GPP), S2-174609, "TS 23.501: P-CR to update 5.15 Network Slicing for non-3GPP access", ETRI, 3GPP SA WG2 Meeting #122, San Jose Del Cabo, Jun. 26-30, 2017, 3 pages.

3rd Generation Partnership Project (3GPP), S2-174885, "5G Registration via Untrusted Non-3GPP Access", Motorola Mobility, Lenovo, Nokia, Alcatel-Lucent Shanghai Bell, Broadcom, Brocade, Interdigital, ETRI, Rogers Wireless, Vodafone, ZTE, 3GPP SA WG2 Meeting #122, San Jose Del Cabo, Jun. 26-30, 2017, 12 pages.

3rd Generation Partnership Project(3GPP), TS 23.501 V0.0.0, Technical Specification Group Services and System Aspects, System Architecture for the 5G System; Stage 2; Release 15, Jan. 2017, 14 pages.

Zhang et al., Research on Open Requirements and Solutions for 5G Network Capability, 2016, 3 pages.

* cited by examiner

TERMINAL REQUESTING NETWORK SLICE CAPABILITIES FROM NON-3GPP ACCESS NETWORK

CROSS-REFERENCE TO RELATED APPLICATION

This application is a continuation of U.S. application Ser. No. 17/509,407, filed Oct. 25, 2021, which is a continuation of U.S. application Ser. No. 16/638,295, issued on Oct. 26, 2021, as U.S. Pat. No. 11,159,937, which is the National Stage entry under 35 U.S.C. § 371 of Patent Cooperation Treaty Application PCT/US2018/046747, filed Aug. 14, 2018, which claims priority from U.S. Provisional Patent Application No. 62/545,160, filed Aug. 14, 2017, each of which is incorporated by reference herein in its entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are disclosed for a wireless transmit/receive unit (WTRU), comprising a memory, and a processor to execute instructions from the memory, wherein the processor is configured to access a non-3rd Generation Partnership Project (3GPP) Access Network (AN), establish a link with a Non-3GPP Interworking Function (N3IWF) via the non-3GPP AN, request information from the N3IWF about network slicing capabilities of a 3GPP Radio Access Network (RAN), receive information from the N3IWF about network slicing capabilities of the 3GPP RAN, and determine whether to register with the 3GPP RAN based upon the network slicing capabilities of the 3GPP RAN. Systems, methods, and instrumentalities are disclosed for sending information about network slicing capabilities of a 3GPP RAN to a N3IWF, establishing a link between a WTRU operating on a non-3GPP AN and the N3IWF via the non-3GPP AN, and sending information from the N3IWF to the WTRU about network slicing capabilities of the 3GPP RAN, wherein the WTRU determines whether to register with the 3GPP RAN based upon the network slicing capabilities of the 3GPP RAN.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
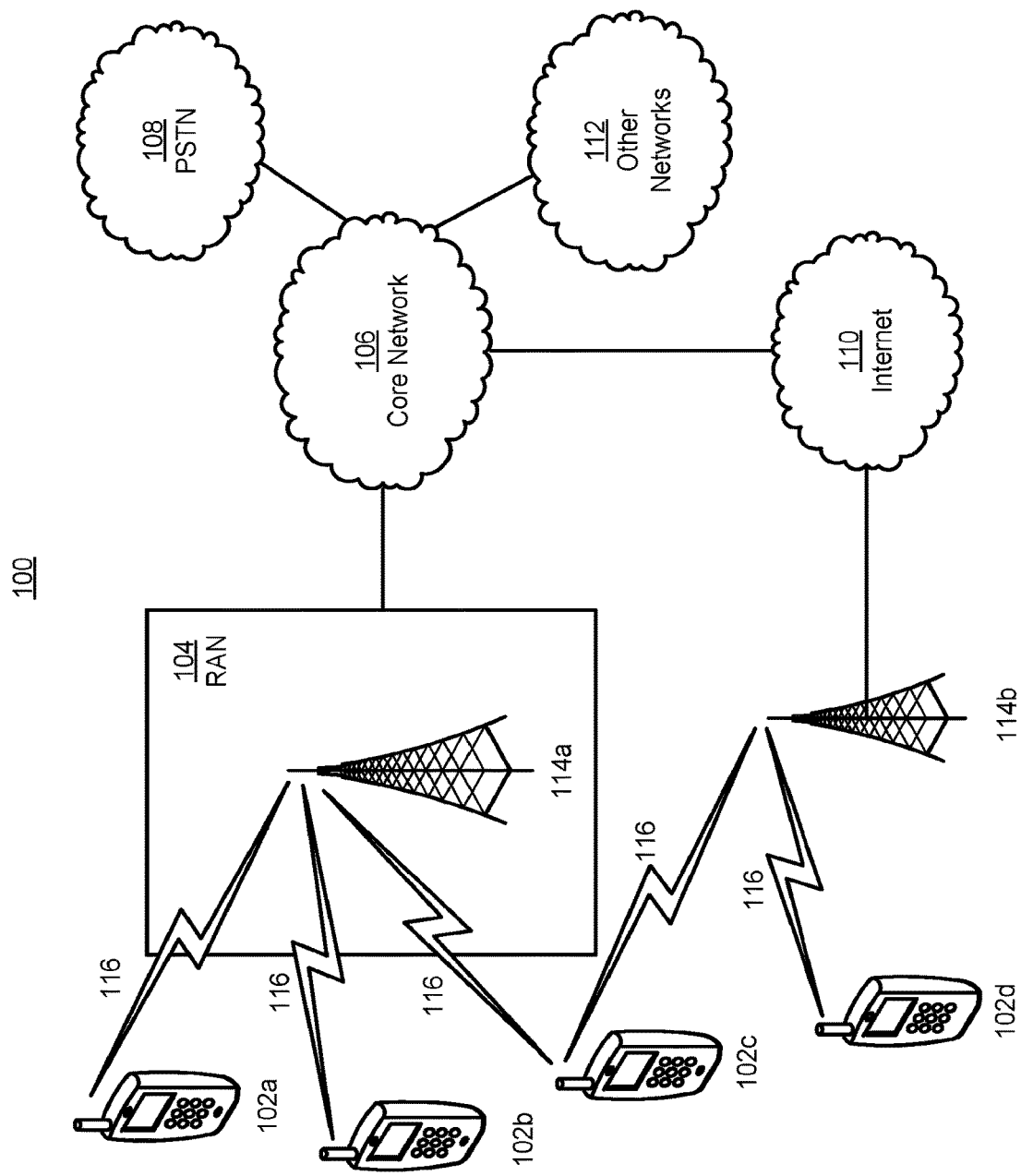
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
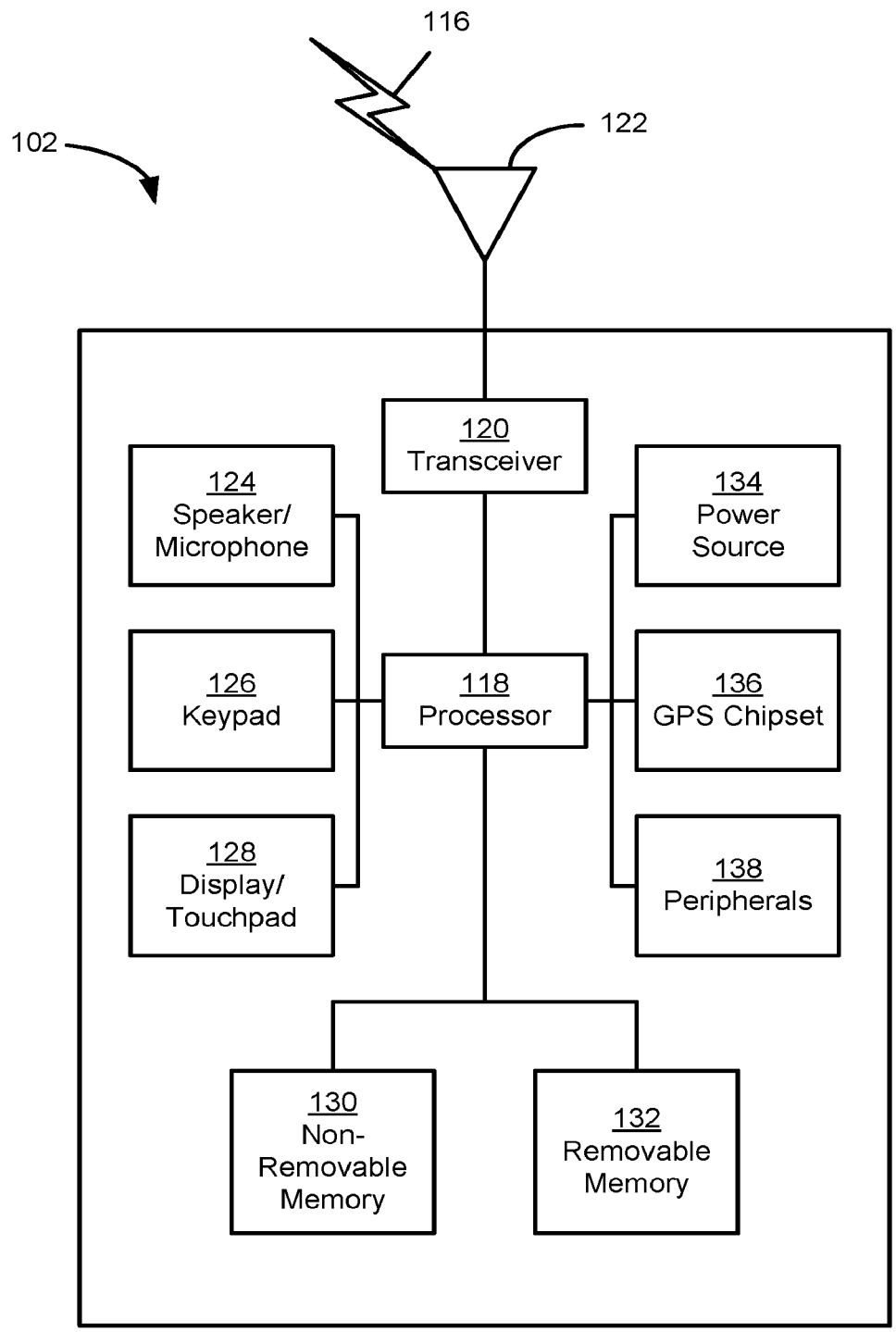
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
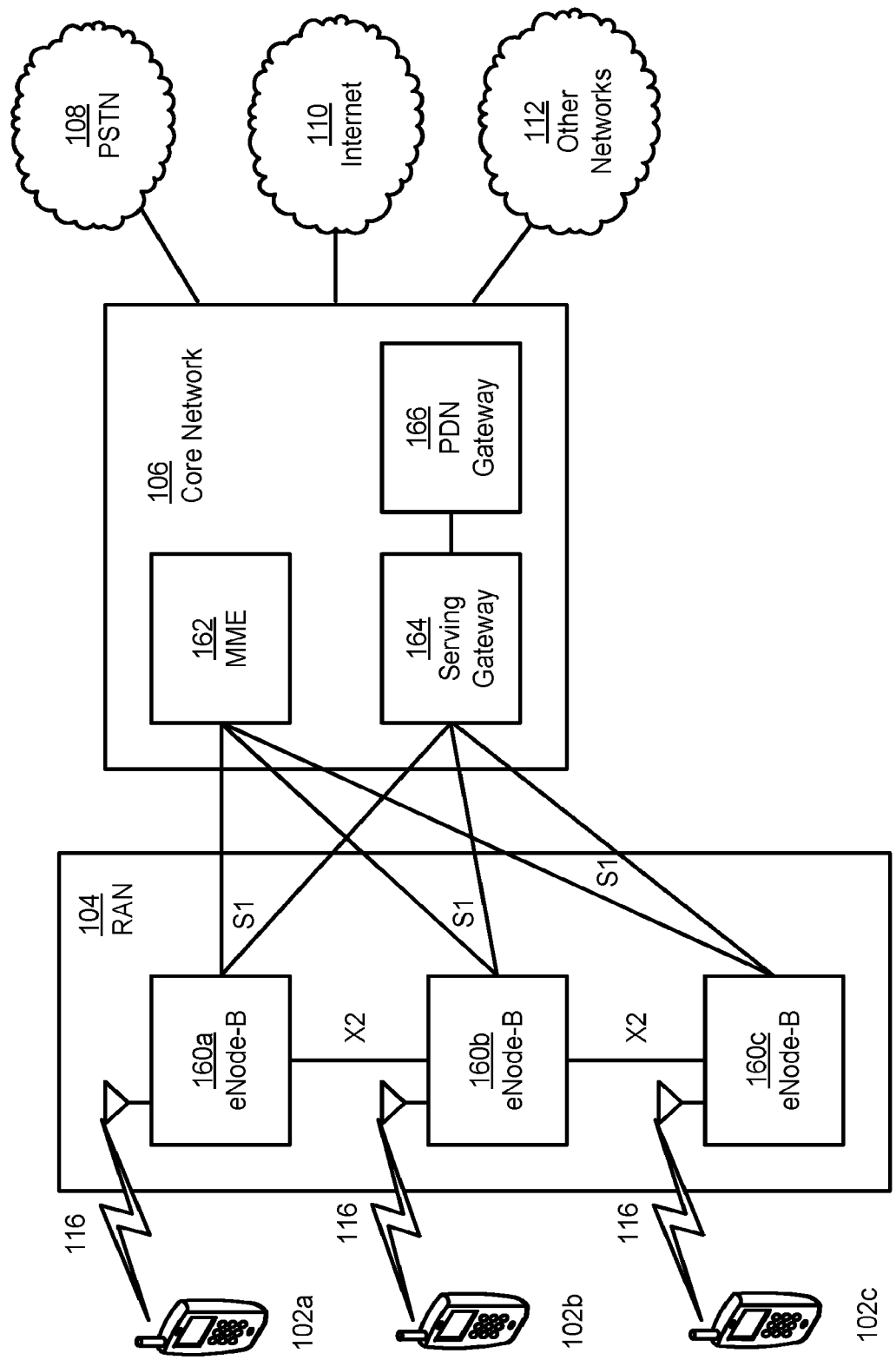
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 1D:
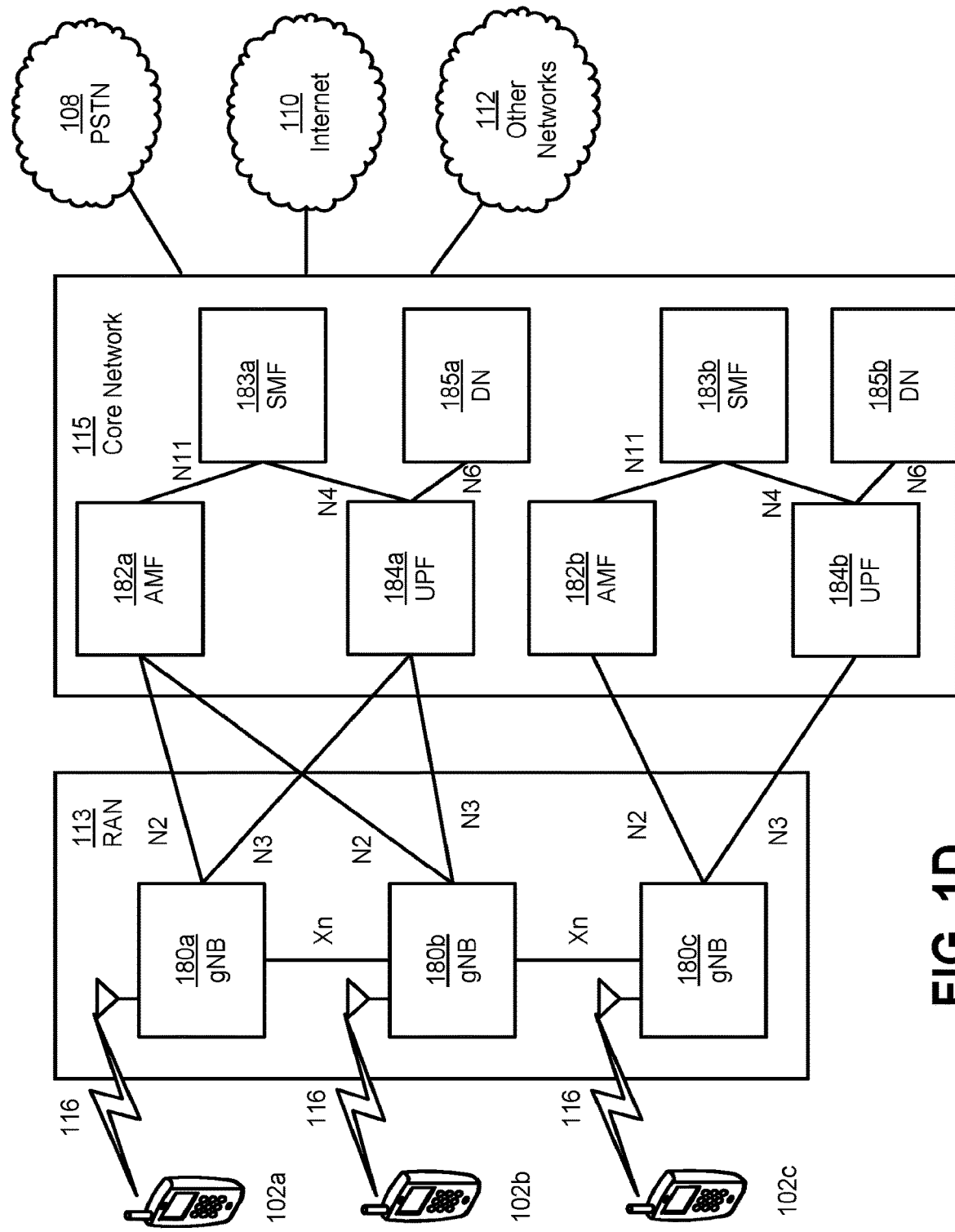
FIG. 1D is a system diagram illustrating a further example RAN and a further example CN that may be used within the communications system illustrated in FIG. 1A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Fifth generation (5G) wireless communication systems may support diverse use cases with different requirements using the same physical infrastructure. A 5G wireless communication system may be implemented, for example, using network slicing, which may virtually partition a network into multiple logical slices. A (e.g., each) slice may be associated with (e.g., specific) network capabilities and characteristics that may cater to requirements of one or more use cases. Different WTRUs may be accessed and/or may be assigned different network slices depending on their capabilities and requested services.

A (e.g., 5G) network may permit a WTRU (e.g., UE) to discover slices that may be supported by the network. In an example, a network slice in a 3rd Generation Partnership Project (3GPP) network may be identified with a Single Network Slice Selection Assistance information (S-NSSAI). An S-NSSAI may comprise, for example, (i) a Slice/Service type (SST), which may refer to expected Network Slice behavior (e.g., in terms of features and services) and (ii) a Slice Differentiator (SD), which may refer to (e.g., optional) information that may complement Slice/Service type(s), e.g., to differentiate amongst multiple Network Slices of the same Slice/Service type. Information regarding a network slice may be generally referred to as NSSAI and/or S-NSSAI herein (and vice versa). There may be various types of NSSAI used for various purposes.

A WTRU may be configured to provide information to assist with selection of an Access and Mobility Management Function (AMF), for example using NSSAI.

A WTRU may be configured by a home Public Land Mobile Network (PLMN) with slicing information, e.g., with a Configured NSSAI per PLMN. A Configured NSSAI may be PLMN-specific. A home PLMN (HPLMN) may indicate one or more applicable PLMN(s) for a (e.g., each) Configured NSSAI.

A WTRU may provide a Requested NSSAI to a network (e.g., upon registration). A WTRU in a PLMN may (e.g., only) use S-NSSAIs that may belong to a Configured NSSAI, if any, of that PLMN.

A WTRU may (e.g., upon successful completion of a WTRU's Registration procedure) obtain (e.g., from an AMF) an Allowed NSSAI for a PLMN, which may include one or more S-NSSAIs. S-NSSAIs may be valid for a current Registration Area (e.g., that a WTRU has registered with) that may be provided by a serving AMF. Multiple S-NSSAIs may be used simultaneously by a WTRU. A received Allowed NSSAI may (e.g., from a WTRU perspective) overwrite a Configured NSSAI associated with a PLMN.

A WTRU may (e.g., during registration) include a Requested NSSAI at Radio Resource Control (RRC) Connection Establishment and in Non-Access Stratum (NAS) messages. A RAN may route NAS signaling between a WTRU and an AMF. An AMF may be selected, for example, using a Requested NSSAI that may be obtained during RRC Connection Establishment. A RAN may route NAS signaling to an AMF from a set of default AMFs, for example, when the RAN may be unable to select an AMF based on a Requested NSSAI.

A WTRU may access a NextGen Core, for example, via non-3GPP access. A Non-3GPP Interworking Function (N3IWF) may provide or support one or more of the following functions: (i) support IPsec tunnel establishment with a WTRU (e.g., N3IWF may terminate IKEv2/IPsec protocols with a WTRU over NWu and may relay over N2 information to authenticate a WTRU and authorize its access to a 5G Core Network); (ii) termination of N2 and N3 interfaces to a 5G Core Network for Control-Plane and user-plane, respectively; (iii) relay uplink and downlink control-plane NAS (e.g., N1) signaling between WTRU and AMF; (iv) handle N2 signaling from SMF (e.g., relayed by AMF) related to PDU sessions and QoS; (v) establish IPsec Security Association (IPsec SA) to support PDU Session traffic; (vi) relay uplink and downlink user-plane packets between WTRU and UPF (e.g., De-capsulation/Encapsulation of packets for IPSec and N3 tunnelling); (vii) enforce QoS corresponding to N3 packet marking (e.g., taking into account QoS requirements that may be associated with such marking received over N2); (viii) N3 user-plane packet marking in the uplink; (ix) local mobility anchor within untrusted non-3GPP access networks (e.g., using IKEv2 Mobility and Multihoming Protocol (MOBIKE)) and/or (x) support AMF selection. The N3IWF may be implemented as a standalone network node or server or may be co-located with one or more other network functions or gateways.

N3IWF may be an interface between non-3GPP access and the 3GPP 5G Core Network. The N3IWF might be an interface towards 3GPP RAN over an Xn interface.

NSSAI may be registration area specific. A WTRU may request or demand different types of slices from a network. Selection of a set of network slice instances for a WTRU in a 3GPP 5G network may be triggered, for example, by the first AMF that may be contacted in a registration procedure, which may lead to a change in AMF. A (e.g., 5G) network may provide inter-working or coordination between cellular network and other RATs, e.g., 3GPP and non-3GPP (e.g., WiFi). Cross-RATs network slicing capability advertisement (e.g., notification of available slices) may be implemented, for example, with coordination between 3GPP and non-3GPP access technologies. Registration Areas (e.g., a set of Tracking Areas where one or more WTRUs may be registered) may be (e.g., independently) assigned and distinct, e.g., as between 3GPP and Non-3GPP access. NSSAIs may be Registration Area specific.

A WTRU attached to a non-3GPP access network may send a message to one or more network entities (e.g., N3IWF) to determine what slices may be available in a 3GPP access network. A WTRU attached to a 3GPP network may acquire information relating to slice availability in a nearby non-3GPP network by requesting such information from one or more network entities (e.g., AMF). Network slicing capability (e.g., in a 3GPP network) may be different among multiple PLMNs and/or amongst different registration areas. A RAN may (e.g., during RRC Connection Establishment) route NAS signaling to an AMF from a set of default AMFs, for example, when the RAN may be unable to select an AMF based on a Requested NSSAI. In some instances, a WTRU may be unable (e.g., without going through a Registration procedure) to re-select AMF in other PLMNs where desired network slices may be available.

WTRUs may obtain information about available network slices across distinct Access Networks (e.g., to provide awareness of network slice availability on 3GPP access while connected to a non-3GPP access and/or vice versa).

Information may be advertised/broadcast (e.g., in 3GPP access stratum, for example using system information) about network slicing capabilities that may be available at non-3GPP accesses.

N3IWF may provide information (e.g., during an association procedure such as through a Generic Advertisement Service (GAS)) about network slicing capabilities that may be available at a 3GPP access.

A RAN may select a PLMN (e.g., and AMF) and/or a Registration Area that may be (e.g., is/are) capable of fulfilling network slicing requests from a WTRU, for example, based on knowledge from the RAN about multiple subscriptions of the WTRU.

A WTRU may be configured to request and/or receive network slicing advertisement information (e.g., information about available network slices for a 3GPP network), for example through non-3GPP access networks.

A WTRU may acquire information regarding an Allowed NSSAI, for example, upon registration with a 3GPP access network.

N3IWF may be utilized, for example, to disseminate information regarding one or more network slices. A 3GPP RAN may, for example, (e.g., periodically) exchange information (e.g., via interfaces such N2 and N3) with a N3IWF about network slicing capabilities. A RAN may have this information, for example, since it may be responsible for AMF selection during WTRU registration. This may be similar to multiple base stations sharing network slicing information (e.g., over an Xn interface). Information exchange may (e.g., also) occur between base stations (e.g., RAN) and N3IWF.

An N3IWF may convey information (e.g., acquired from a 3GPP RAN) to a WTRU, for example, over an IPsec tunnel (e.g., via IPv6 neighbor discovery messages, over ICMP, over DHCP, etc.).

Figure 2:
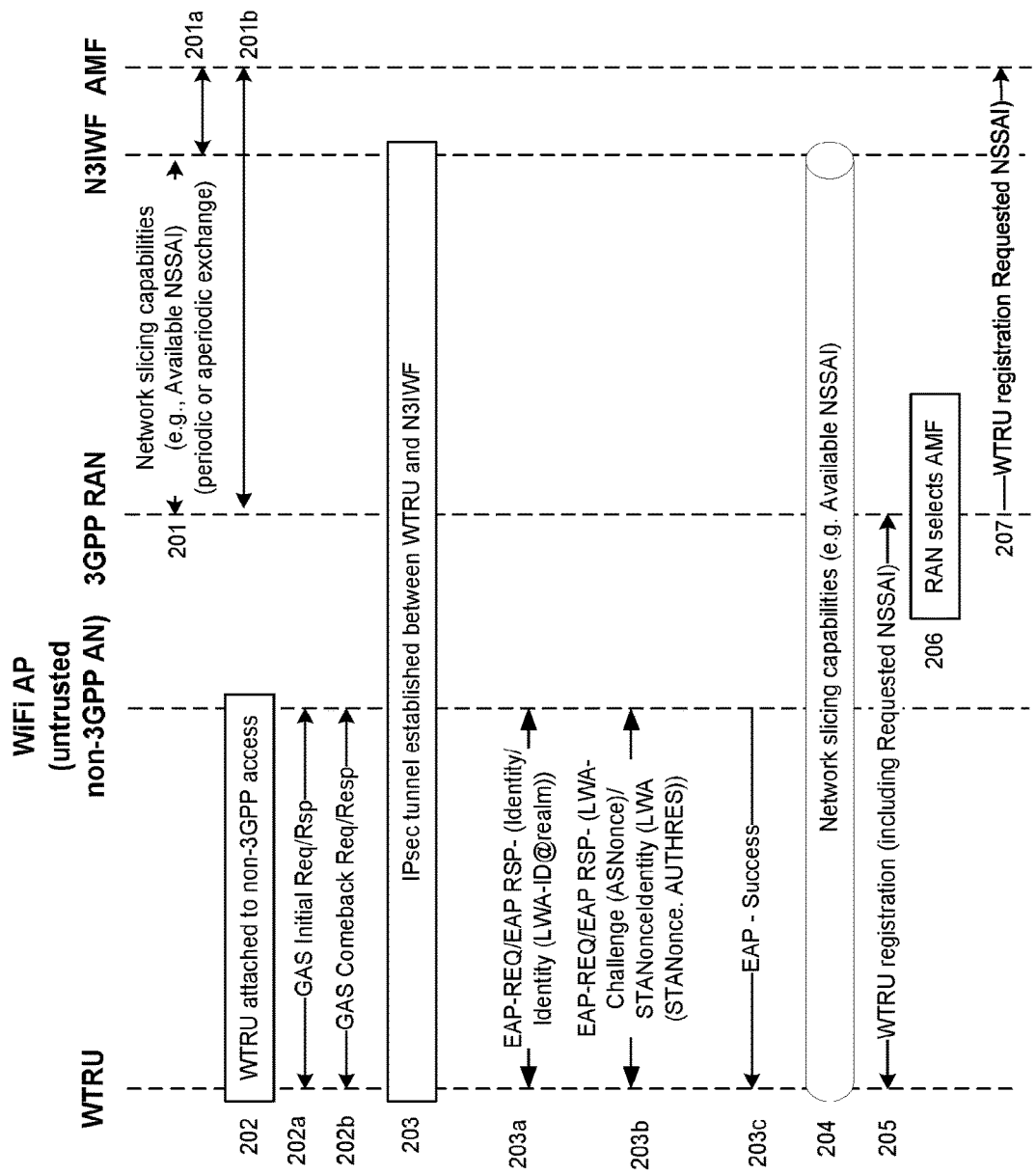
FIG. 2 is an example of network slicing advertisement through untrusted non-3rd Generation Partnership Project (3GPP) access.

FIG. 2 is an example of network slicing advertisement through untrusted non-3GPP access. FIG. 2 shows an example of how a WTRU may decide to register with a 3GPP RAN, for example, based on network slicing information that may be fetched from non-3GPP (e.g., WiFi) Access.

Example procedures are described with numeric references that do not limit this example or other examples to a particular order or number of activities (e.g., communication messages, analyses, determinations, selections and/or other activities). Examples presented and other examples may be implemented with any number and order of procedural activities, which may be the same or different (e.g., additional and/or alternative) relative to activities presented in examples.

At 201, 201a, 201b, a 3GPP RAN may, for example, share (e.g., periodically and/or aperiodically) its network slicing capabilities with an N3IWF. For example, at 201 a 3GPP RAN may inform a N3IWF of network slicing capabilities by sharing slicing information, such as, for example, Available NSSAI (e.g., a set of one or more S-NSSAI for slice(s) that are available). At 201a, an AMF and a N3IWF may exchange network slicing capabilities information (e.g., Available NSSAI). At 201b, an AMF and a 3GPP RAN may exchange network slicing capabilities information (e.g., Available NSSAI). At 201, 201a, 201b, information may be updated periodically. At 201, 201a, 201b, information may be updated on a per-event basis. An N3IWF may, for example, store this information. Information may be (e.g., regularly) updated, for example, using (e.g., periodic and/or aperiodic) incoming information (e.g., from a 3GPP RAN). A 5G CN may (e.g., also) update gNBs and a N3IWF with information, e.g., regarding neighboring ANs. Dynamic Xn and NG-C(N2 TNL) interface Configuration procedures may (e.g., also) be used to transfer slicing capabilities, for example, between one or more gNBs and N3IWFs and/or between one or more 5G CNs and applicable ANs.

At 202, a WTRU may (e.g., as it is powered on), for example, initially be associated with a non-3GPP (e.g., WiFi) access point for services. At 202a, 202b, Generic Advertisement Services (GAS) may be used, for example, to retrieve slicing information.

At 203, a WTRU may, for example, establish an IPsec tunnel with an N3IWF, e.g., to receive information from the N3IWF. At 203a, 203b, 203c, a WTRU may, for example, use Extensible Authentication Protocol (EAP) to encapsulate slicing information between the WTRU and an N3IWF. This may be accomplished, for example, with a vendor-specific procedure that may use EAP packets with an "Expanded" type. In an example, a vendor-specific EAP procedure may comprise EAP-LWA, which may use an existing 3GPP vendor-id that may be registered with IANA (e.g., under an SMI Private Enterprise Code registry).

At 204, an N3IWF may, for example, relay 3GPP RAN network slicing capability information (e.g., Available NSSAIs (e.g., a set of one or more S-NSSAI for slice(s) that are available)) to a WTRU (e.g., via an established IPsec tunnel). An N3IWF may, for example, provide a list of Available S-NSSAI on a per Registration Area basis. Relaying of information may be periodic and/or aperiodic. In an example, (e.g., aperiodic) relaying may be triggered, for example, by one or more of the following: (i) an occurrence of one or more events; (ii) a request from a WTRU and/or (iii) a decision by a network.

Relaying of 3GPP RAN network slicing capability information may be triggered, for example, by one or more events. Examples of events that may trigger relaying may include, for example, one or more of the following: (i) a WTRU may move (e.g., to a specific location); (ii) a WTRU battery and/or WTRU mobility may reach a certain level or threshold; and/or (iii) a WiFi traffic level may reach a certain level or threshold.

An N3IWF may obtain information relating to occurrence(s) of one or more events, for example, via one or more Application Programming Interfaces (APIs) that may be capable of extracting context information for WiFi radio access and a WTRU. Context information may be, for example, in a virtualized computing platform (e.g., as part of "services" in a Multi-Access Edge Computing (MEC) architecture).

Relaying of 3GPP RAN network slicing capability information may be triggered, for example, by a request from a WTRU. In an example, a WTRU may send a request message to a WiFi Network, for example, when a desirable network slice may not be available. A request may be transported, for example, by IPv6 neighbor/router solicitations, DHCP requests, etc.

Relaying of 3GPP RAN network slicing capability information may be triggered, for example, by a network. A network decision may be made, for example, based on context information for WiFi radio access and/or for a WTRU. Context information may be extracted, for example, via one or more APIs (e.g., in a virtualized computing platform). Context information may be extracted, for example, as part of "services" in Multi-Access Edge Computing (MEC) architecture.

At 205, a WTRU may (e.g., based on received information), for example, find that a 3GPP RAN may provide one or more network slices that may fit its requirement better. A WTRU may (e.g., decide to) initiate a registration process with a 3GPP RAN (e.g., using a requested NSSAI). A requested NSSAI may be, for example, a subset of an available NSSAI (e.g., that may have been previously shared via an N3IWF). At 206, the 3GPP RAN may select an AMF. At 207, the WTRU may provide the requested NSSAI to the network.

Advertisement of network slicing capabilities may be available, for example, at non-3GPP access. A WTRU may attach to a 3GPP access network (e.g., directly) after it is powered on. A WTRU may request a set of network slices (e.g., Requested NSSAI), for example, from a 3GPP network (e.g., during registration process). A 3GPP RAN may (e.g., also) provide information (e.g., available NSSAI) to a WTRU. A WTRU (e.g., without available information) may be unable to obtain information about a network slicing capability of a (e.g., nearby) non-3GPP network. Information exchange between a 3GPP RAN and an N3IWF may (e.g., also) cover network slicing capability. A non-3GPP access network (e.g., WiFi) may (e.g., periodically or aperiodically) provide information (e.g., relating to its network slicing capabilities) to a 3GPP RAN (e.g., via an N3IWF). A 3GPP RAN may become aware of the availability of requested slices, for example, through an N3IWF, which may be reachable from the location of a WTRU (e.g., meeting end-to-end requirements of a slice). A RAN may, for example, embed information relating to network slicing capability of at least one non-3GPP network (e.g., that may be near a WTRU) in none or more signals, such RRC-Connection-ReConfiguration messages (e.g., during and/or after registration).

Figure 3:
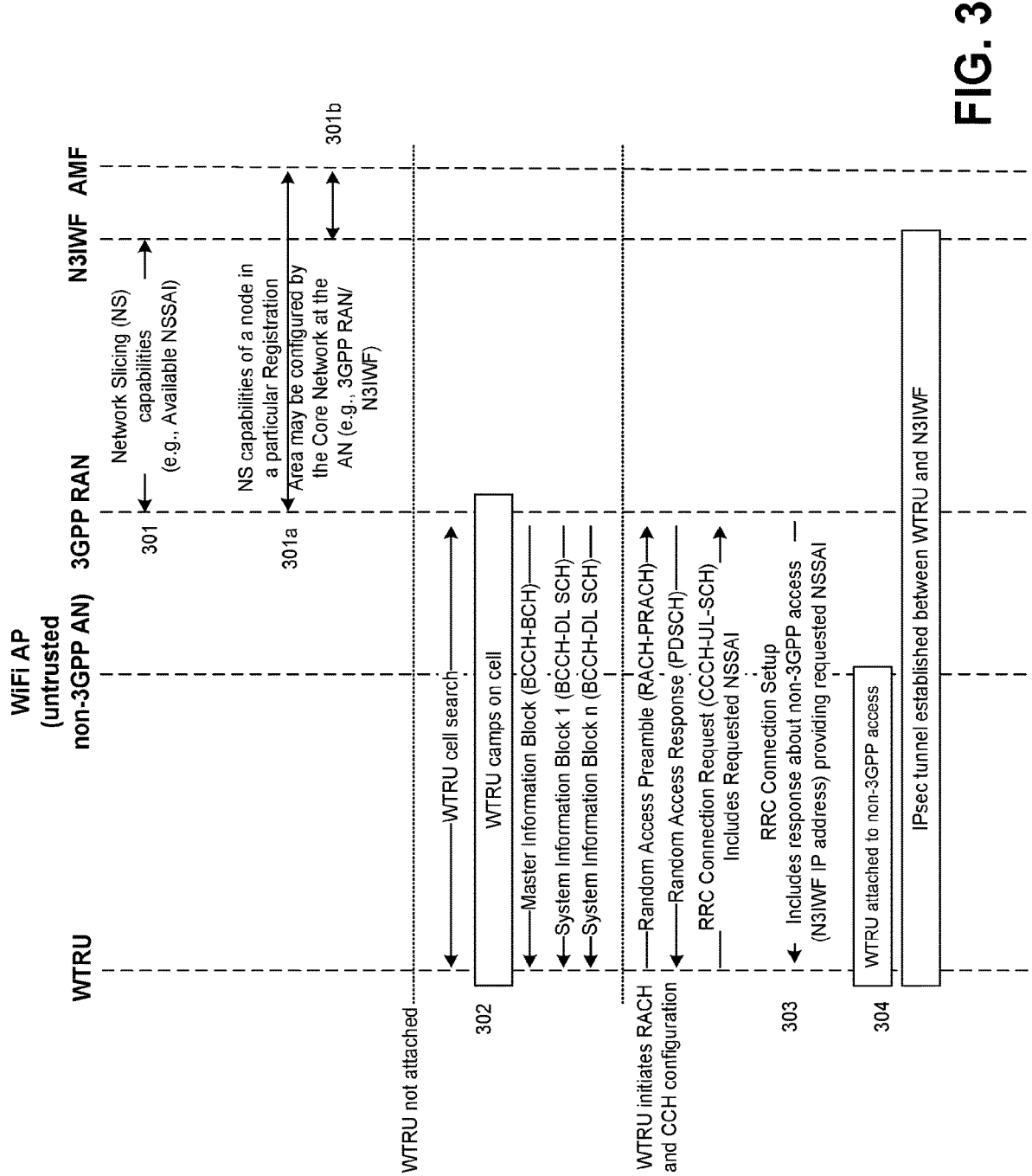
FIG. 3 is an example of network slicing advertisement about network slices that may be available through untrusted non-3GPP access.

FIG. 3 is an example of network slicing advertisement about network slices that may be available through untrusted non-3GPP access. FIG. 3 shows an example procedure that a WTRU may use to obtain network slicing information of WiFi Access from 3GPP RAN.

In an example (e.g., at 301), a 3GPP RAN may (e.g., periodically or aperiodically) fetch network slicing capabilities of a WiFi access network from an N3IWF. In an example (e.g., at 301a, 301b), NS capabilities (e.g., Available NSSAI) of a node in a Registration Area may be configured, for example, by a CN at an Access Network (AN) (e.g., 3GPP RAN/N3IWF).

At 302, a WTRU may (e.g., as the WTRU may power on), for example, search for 3GPP RAN base stations (e.g., gNBs), which may be implemented, for example, based on received synchronization signals (e.g., PSS/SSS) and/or system information (e.g., MIB/SIBs). A WTRU may initiate an attachment process, for example, to commence network registration.

At 303, a 3GPP RAN may (e.g., during a registration process), for example, transmit a message (e.g., for RRC connection setup). A message may comprise, for example, one or more of the following: (i) information that may relate to a network slicing capability of a non-3GPP access network and/or (ii) an N3IWF IP Address.

At 304, a WTRU may (e.g., based on received information), for example, determine that non-3GPP access may provide one or more network slices that may fit its requirement better. A WTRU may decide to initiate attachment to a corresponding non-3GPP access network.

One or more S-NSSAI from a (e.g., only one) PLMN may limit possibilities for WTRUs (e.g., with multiple subscriptions) to find potential network slices from other subscribed PLMNs. Different PLMNs may (e.g., periodically and/or aperiodically) exchange information relating to their available NSSAI. A RAN belonging to a first PLMN may provide information regarding its available NSSAI to a WTRU and may (e.g., also) provide information regarding available NSSAI of a second PLMN.

Figure 4:
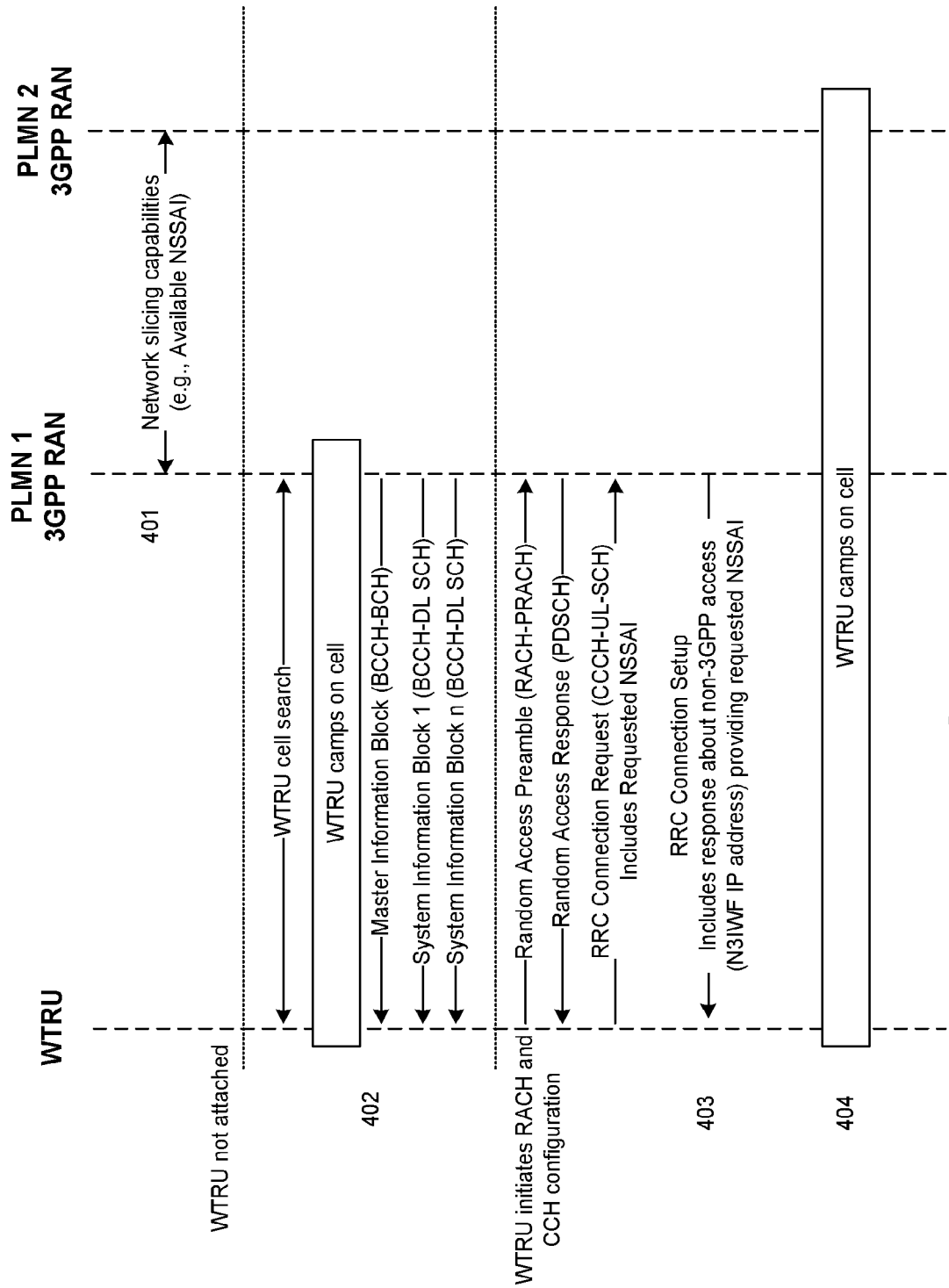
FIG. 4 is an example of network slicing advertisement about network slices of other Public Land Mobile Networks (PLMNs).

FIG. 4 is an example of network slicing advertisement regarding network slices of other PLMNs.

In an example (e.g., as shown in FIG. 4), a 3GPP RAN may belong to different PLMNs. At 401, different PLMNs may, for example, (e.g., periodically or aperiodically (e.g., as information changes)) exchange information relating to their network slicing capabilities. In an example, a CN may (e.g., also) be involved in an exchange of network slicing capabilities.

At 402, a WTRU (e.g., subscribing to a first PLMN and a second PLMN) may (e.g., as it is powered on), for example, search for 3GPP RAN base stations (e.g., gNBs) for its one or more subscribed PLMNs. This may be implemented, for example, based on received synchronization signals (e.g., PSS/SSS) and/or system information (e.g., MIB/SIBs). A WTRU may initiate an attachment process, for example, to commence network registration (e.g., with a first PLMN).

At 403, a RAN belonging to a first PLMN may (e.g., during a registration process), for example, transmit a message (e.g., for RRC connection setup). A message may comprise, for example, one or more of the following: (i) an Available-NSSAI of a RAN belonging to the first PLMN and/or (ii) an Available-NSSAI of a RAN belonging to the second PLMN.

At 404, a WTRU may (e.g., based on received information), for example, determine that a RAN belonging to the second PLMN may provide one or more network slices that may fit its requirement better. The WTRU may decide to initiate attachment to the RAN belonging to the second PLMN.

Systems, methods, and instrumentalities have been disclosed for advertising and selecting network slices across multiple access technologies (e.g., 3GPP and non-3GPP access) and multi-subscriber scenarios in 5G. WTRUs may, for example, obtain information about available network slices across distinct Access Networks, which may, for example, provide awareness of network slice availability for 3GPP access while connected to a non-3GPP access and vice versa. Information may be advertised/broadcast (e.g., in 3GPP access stratum) about network slicing capabilities that may be available at non-3GPP accesses. An N3IWF may provide information (e.g., during an association procedure) about network slicing capabilities that may be available at a 3GPP access. A RAN may select a PLMN (e.g., and AMF) and/or a Registration Area that may be capable of fulfilling one or more network slicing requests from a WTRU, e.g., based on knowledge from a RAN regarding multiple subscriptions of the WTRU.

Figure 5:
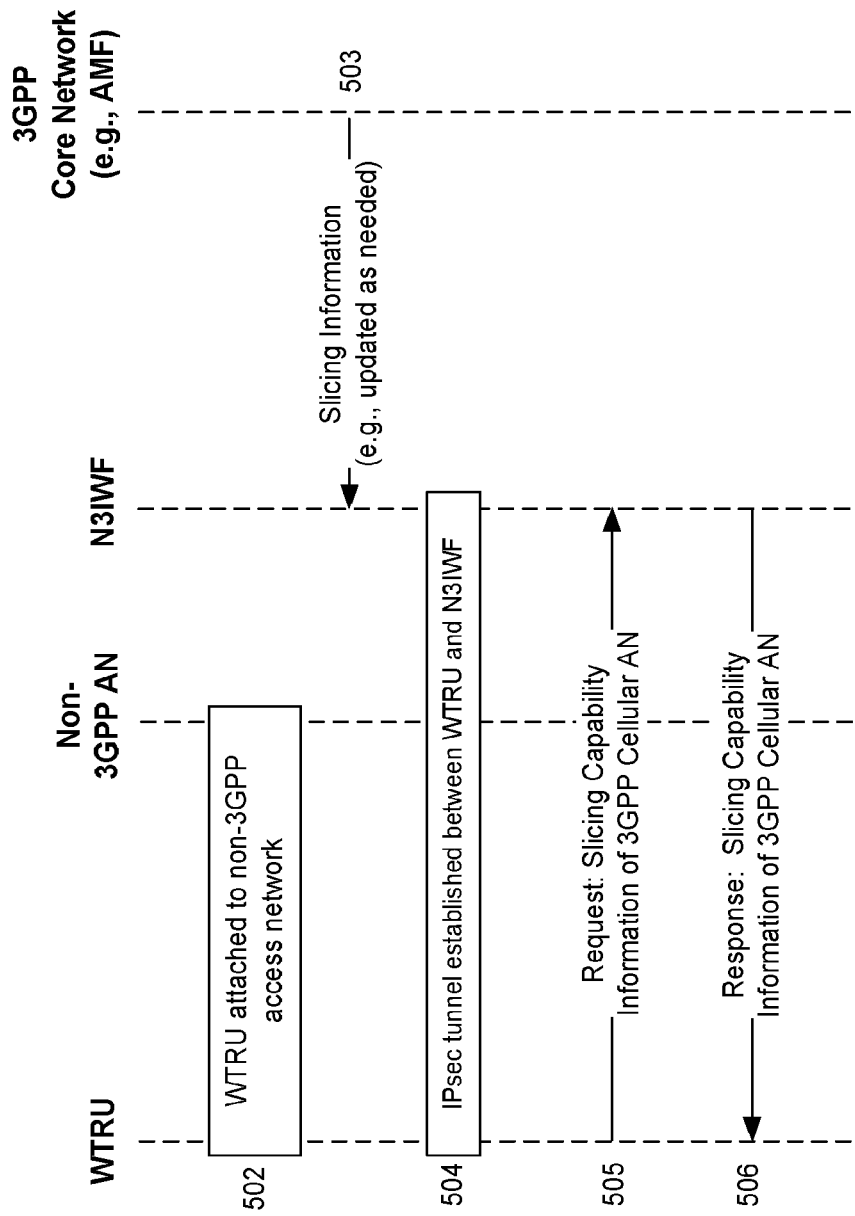
FIG. 5 is an example of network slicing advertisement through non-3GPP access.

FIG. 5 is an example of network slicing advertisement through non-3GPP access. At 502, the WTRU may attach to a non-3GPP access network. At 503, the 3GPP RAN may provide information to (e.g., share with) the N3IWF about network slicing capabilities. At 504, the WTRU may establish a secure link (e.g., IPSec tunnel) with the N3IWF via the non-3GPP access network. At 505, the WTRU may (e.g., prior to registering with that 3GPP network) request slicing information for the 3GPP cellular network from the N3IWF using the established secure link. At 506, the WTRU may receive the slicing information for the 3GPP cellular network from the N3IWF. The WTRU may determine whether or not to register to the 3GPP cellular network (e.g., based on the received slicing information).

The processes and instrumentalities described herein may apply in any combination, may apply to other wireless technologies, and for other services.

A WTRU may refer to an identity of the physical device, or to the users identity such as subscription related identities, e.g., MSISDN, SIP URI, etc. WTRU may refer to application-based identities, e.g., user names that may be used per application.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising a processor and memory, the processor and memory configured to:
   send a request to a 3rd Generation Partnership Project (3GPP) core network;
   receive, from the 3GPP core network, information indicating that a first set of one or more network slices are accessible via one or more tracking areas associated with one or more radio access networks;

receive system information from a first radio access network, the system information indicating accessibility to the first set of one or more network slices accessible via at least one of the one or more tracking areas; and access the first radio access network in order to establish a connection to use at least one of the first set of one or more network slices.

2. The WTRU of claim 1, wherein the processor and memory are configured to receive a radio resource control message from the first radio access network, the radio resource control message indicating that a second set of one or more network slices are accessible via a second radio access network.

3. The WTRU of claim 2, wherein the first radio access network comprises a first base station and the second radio access network comprises a second base station.

4. The WTRU of claim 3, wherein the first base station is associated with a first public land mobile network and the second base station is associated with a second public land mobile network.

5. The WTRU of claim 1, wherein the first set of one or more network slices are associated with at least one respective network slice selection assistance information (NSSAI).

6. The WTRU of claim 1, wherein the processor and memory configured to access the first radio access network comprises the processor and memory being configured to transmit a random access preamble and receive a random access response.

7. The WTRU of claim 1, wherein the processor and memory are configured to send an indication to the first radio access network that the WTRU is connecting to the first radio access network in order use the at least one of the first set of one or more network slices.

8. A method implemented by a wireless transmit/receive unit (WTRU), the method comprising:

sending a request to a 3rd Generation Partnership Project (3GPP) core network;

receiving, from the 3GPP core network, information indicating that a first set of one or more network slices are accessible via one or more tracking areas associated with one or more radio access networks;

receiving system information from a first radio access network, the system information indicating accessibility to the first set of one or more network slices accessible via at least one of the one or more tracking areas; and accessing the first radio access network in order to establish a connection to use at least one of the first set of one or more network slices.

9. The method of claim 8, comprising receiving a radio resource control message from the first radio access network, the radio resource control message indicating that a second set of one or more network slices are accessible via a second radio access network.

10. The method of claim 9, wherein the first radio access network comprises a first base station and the second radio access network comprises a second base station.

11. The method of claim 10, wherein the first base station is associated with a first public land mobile network and the second base station is associated with a second public land mobile network.

12. The method of claim 8, wherein the first set of one or more network slices are associated with at least one respective network slice selection assistance information (NSSAI).

13. The method of claim 8, wherein accessing the first radio access network comprises transmitting a random access preamble and receiving a random access response.

14. The method of claim 8, comprising sending an indication to the first radio access network that the WTRU is connecting to the first radio access network in order use the at least one of the first set of one or more network slices.

* * * * *